Patented Sept. 4, 1934

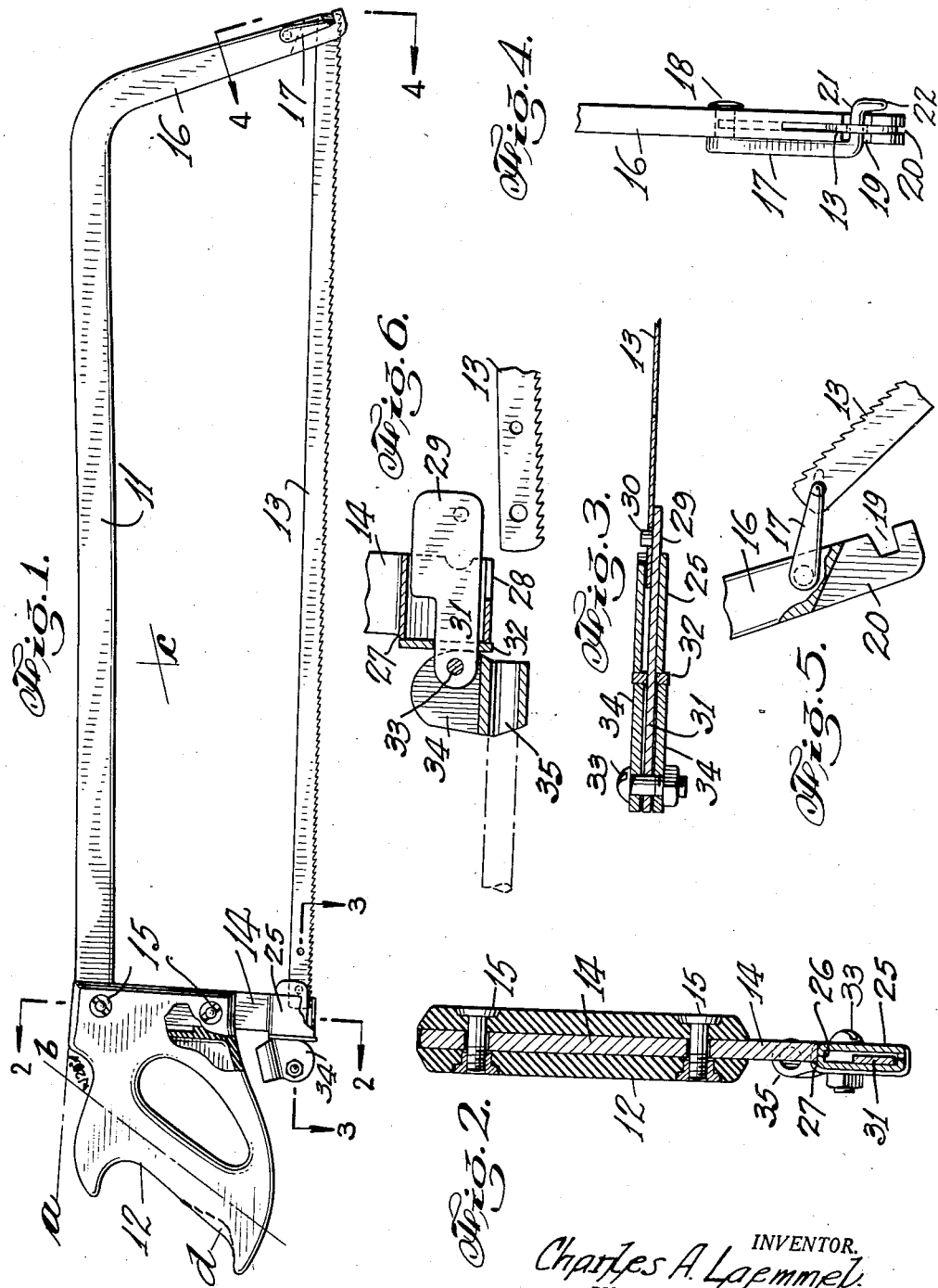

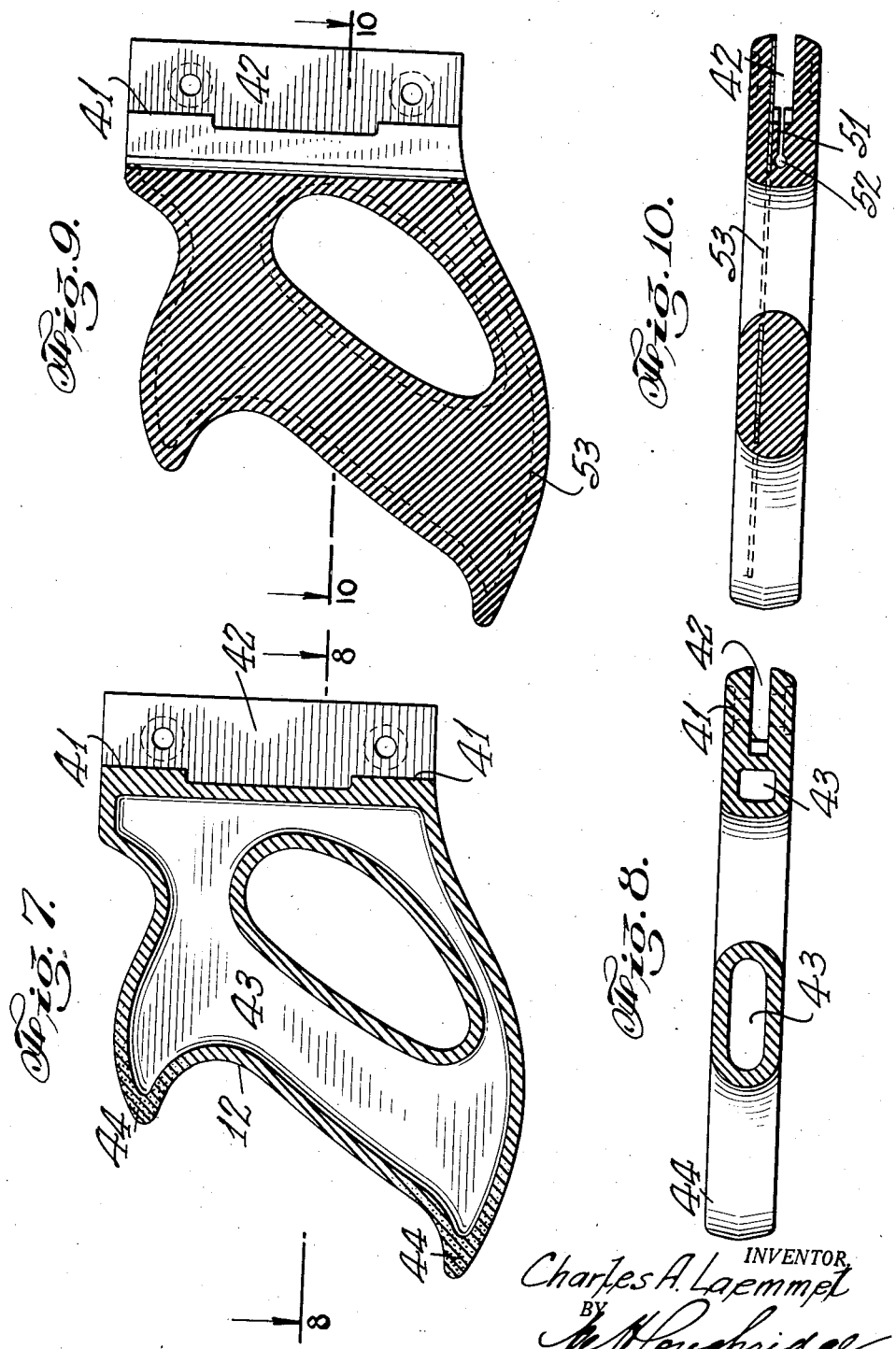

1,972,566

UNITED STATES PATENT OFFICE 1,972,566

MEAT SAW

Charles A. Laemmel, Brooklyn, N. Y., assignor to Atlantic Service Company, Inc., Brooklyn, N. Y., a corporation of New York Application January 19, 1933, Serial No. 652,472

4 Claims. (Cl. 145—108)

This invention relates to saws and is particularly adaptable to meat saws and has for an object to provide an improved attachment for saw blades to a saw frame and a further object of the invention is to provide handles for saws made from moulded material and which may be moulded hollow and also with a reinforcing member. Other objects of the invention reside in the details of construction as more particularly described in the following specifications and illustrated in the accompanying drawings, selected to show one form of the invention, and in which:

Fig. 1 is a side elevation of a form of meat saw embodying my invention and in which a portion of the handle is broken away to show the internal construction;

Fig. 2 is a cross section on line 2—2, Fig. 1, where the handle is secured to the frame;

Fig. 3 is a cross section on line 3—3, Fig. 1, showing the eccentric attachment for the saw blade;

Fig. 4 is an end view on line 4—4, Fig. 1, of the attachment of the blade at the outer end of the frame;

Fig. 5 is a detail, partly sectioned, of the attachment shown in Fig. 4, and

Fig. 6 is a detail, partly sectioned, of the slot and cam in Fig. 3, for securing the blade to the frame.

Fig. 7 is a longitudinal section, in elevation, of a moulded type of saw handle;

Fig. 8 is a sectional view on line 8—8 of Fig. 7,

Fig. 9 is a sectional elevation of another form of moulded saw handle, and

Fig. 10 is a cross section on line 10—10 of Fig. 9.

Meat saws usually comprise a frame, a handle, and a saw blade. The blade is mounted in the frame so as to be readily removable for reconditioning purposes. It is attached to the frame through a slot arrangement and by a cam lock which maintains the blade in alignment and under tension. As the saw has to be frequently cleaned it is desirable to avoid projecting the loose parts as far as possible. With this end in view the slot in which the cam mechanism operates is attached to the frame by welding which forms a smooth, regular surface with the frame and avoids rivets and bolts. The outer end of the saw blade passes through a slot in the frame and is held in position by a toe-piece which is pivoted to the frame and which engages both sides of the frame when in the locked position to prevent the members of the frame from spreading.

Instead of the customary wood handle, the present invention contemplates the use of a handle which may be moulded from hard rubber or other plastic material and which has the advantage of lightness and elasticity, in addition to providing a sanitary handle which is easily cleaned. The preferred form of the handle is made in a pressure mould, in which, by the agency of steam, hydraulic or other pressure, the material is forced around the walls of the mould, leaving the interior hollow, resulting in a handle which is light, durable, and which possesses a certain degree of resiliency in use. The moulded handle also permits the use of a reinforcing member embodied in the mould and which may be included in the attachment to the saw frame. It has been found, after considerable experimenting, that a particular type of grip and a particular angle of the grip relative to the saw frame, as hereinafter described, can be used with the greatest facility in sawing meat.

In the drawings, 11 is the saw frame, 12 is the handle and 13 is the saw blade; the frame is secured to the vertical end of the saw frame by the screws 15. The outer end of the saw frame 16 is provided with the toe-piece 17 which engages an aperture in the end of blade 13 to hold the blade in the slot. This construction will be understood from the detailed drawings, Figs. 4 and 5. The frame 16 is slotted at 20 and notched at 19 so that the toe-piece 17, which is pivoted to the frame at 18 and is provided with a right angle bend 21 arranged to align with the notch 19 and upon which the blade 13 is threaded, securely holds the blade in the slot 20. It will be noted that the end 22 of the toe-piece engages the opposite side of the frame 16 from the portion 17. This prevents the jaws forming slot 20 from spreading. By extending the end 22 in the same direction as the portion 17 the toe-piece is thereby usable on either side of frame 16.

The end of the frame 14 has welded thereto at 27 the member 25 which is formed from sheet stock with the edges abutting at 26 to form the elongated slot for the sliding member 29. The welded attachment at 27 secures the sides of the slot where they abut at 26 and forms a curved attachment to the frame 14 which is easily kept clean. The sliding member 29 has a stud 30 engaging a hole in the saw blade 13, the end of the saw blade projecting into the slot 25 and centering on the frame as shown. A slot 28 is provided in the lower edge of 25 through which the saw teeth project. A tang 31, on the end of 29, passes through a washer 32, and by means of bolt 33 connects with the cam or eccentric 34 which bears against washer 32 and which is provided with a socket 35 in which a tool is placed for operating the cam. This forms a quick and convenient means for changing saw blades.

The saw handle, Fig. 7, is provided with a slot 42 for securing to the frame 14 by the usual screws 15. In order to obtain a rigid seating between the saw frame and the saw handle, pads 41 are provided at the top and bottom of the slots in the moulded handle and which bear snugly against the saw frame. The interior of the handle is open as indicated at 43, leaving a wall forming the contour of the handle. This construction is readily understood in the moulding of vulcanized rubber products and it is possible by this moulding process, to make the composition somewhat softer and less brittle as indicated by the shading at 44 on the horns of the handle. This has the advantage of preventing chipping of the handle at these points.

In the modification shown in Figs. 9 and 10, the handle is indicated as made from a solid moulding and is provided with a reinforcing template 53 which may extend to the jaws 42 so as to engage the screws attaching the handle to the frame. In order to avoid the possibility of fracturing the material at the jaws 42 by the attaching screws, a slot 51 is provided, terminating in a cylindrical groove 52 which distributes the strain of the clamp attachment.

It will be observed from Fig. 1 that the grip portion of the handle 12 is substantially straight and parallel and is not under cut as indicated in dotted outline at $d$. It will also be observed that the angle of the grip relative to the back of the saw, as indicated by the lines $a$ and $b$ is approximately 120°. The center of gravity of a saw of the type shown is located approximately at $c$.

The straight grip of the handle engages the ball of the hand in such a way that the operator has a better control of the saw than is possible in saw handles of the under cut type. These saws are used for cutting on the horizontal, they are also used for cutting overhead and for cutting below the horizontal and after considerable experimenting it has been found that by placing the grip at substantially 120° to the back of the saw a handle could be made that would be satisfactory for sawing in any of these positions and that would not unduly fatigue the user. This construction enables a single saw frame to be used for work that heretofore required two or more saw frames having different shaped handles.

The invention has been described in connection with meat saws but it is to be understood as applying to saws in general.

Having thus described my invention, I claim:

1. A saw comprising a handle and a blade, said handle being moulded as an integral unit from vulcanized rubber, with the horns of the handle moulded softer than the body of the handle, said handle being clamped to said blade.

2. A meat saw comprising a frame, a handle and a saw blade, said handle being moulded from yieldable material and formed with clamping jaws for clamping to said frame, and having a slot terminating in a groove parallel with the base of said jaws and extending into the body of said handle from the base of said jaws and clamping means passing through said jaws for securing said blade in said jaws.

3. A saw comprising a frame, a handle and a saw blade, said handle being made with a jaw for clamping to said frame and with pads at the base of said jaw and with a slot formed in the bottom of said jaw through said pads, said slot terminating in a groove parallel with the base of the jaw formed in the body of the handle and clamping means passing through said jaw for securing said blade in the jaw.

4. A handle for a saw comprising a body with a grip and a jaw for clamping to the saw, said jaw having spaced pads formed integral with the handle, projecting outwardly from the bottom thereof to engage the saw and having a slot projecting into the body of the handle from the bottom of said jaw through said pads and parallel with the sides of the jaw.

CHARLES A. LAEMMEL.